United States Patent
Dietzenbach

(10) Patent No.: US 10,137,747 B2
(45) Date of Patent: Nov. 27, 2018

(54) WEIGHT DISTRIBUTION CARRIER

(71) Applicant: Phillip J. Dietzenbach, Concord, NC (US)

(72) Inventor: Phillip J. Dietzenbach, Concord, NC (US)

( * ) Notice: Subject to any disclaimer, the term of this patent is extended or adjusted under 35 U.S.C. 154(b) by 14 days.

(21) Appl. No.: 15/828,826

(22) Filed: Dec. 1, 2017

(65) Prior Publication Data
US 2018/0154714 A1 Jun. 7, 2018

Related U.S. Application Data

(60) Provisional application No. 62/428,716, filed on Dec. 1, 2016.

(51) Int. Cl.
| | |
|---|---|
| *B60D 1/06* | (2006.01) |
| *B62B 1/06* | (2006.01) |
| *B62B 1/26* | (2006.01) |
| *B60D 1/167* | (2006.01) |
| *B60D 1/24* | (2006.01) |

(52) U.S. Cl.
CPC ........... *B60D 1/065* (2013.01); *B60D 1/1675* (2013.01); *B60D 1/247* (2013.01)

(58) Field of Classification Search
CPC .. B62B 1/047; B62B 1/06; B62B 1/08; B62B 1/277; B62B 1/25; B62B 1/22; B62B 1/26; B62B 1/125; B62B 1/262; B62B 2203/10; B60D 1/247
USPC ................ 280/47.29, 47.21, 74.1, 74.3, 655, 280/DIG. 11
See application file for complete search history.

(56) References Cited

U.S. PATENT DOCUMENTS

| | | | | |
|---|---|---|---|---|
| 2,514,563 | A * | 7/1950 | Todd ......................... | B66F 9/02 187/233 |
| 2,903,147 | A * | 9/1959 | Davis, Jr. ............. | B25H 1/0007 254/112 |
| 3,045,851 | A * | 7/1962 | Rupert ...................... | B62B 1/14 280/15 |
| 3,458,173 | A | 7/1969 | Kornovich et al. | |
| 4,637,626 | A * | 1/1987 | Foss ...................... | A45C 13/385 16/113.1 |
| 4,645,181 | A * | 2/1987 | Schapansky ............ | B66F 3/247 254/2 B |
| 4,717,168 | A * | 1/1988 | Moon, Sr. ................. | B62B 3/02 188/19 |
| 4,746,141 | A * | 5/1988 | Willis ...................... | B25H 1/00 269/17 |
| 4,754,985 | A * | 7/1988 | Im .......................... | B62B 1/125 280/40 |
| 5,123,803 | A * | 6/1992 | Crabtree ................... | B62B 3/10 269/17 |
| 5,375,867 | A | 12/1994 | Kass et al. | |

(Continued)

*Primary Examiner* — Anne Marie M Boehler
(74) *Attorney, Agent, or Firm* — Zarley Law Firm, P.L.C.

(57) ABSTRACT

A weight distribution carrier is provided. The weight distribution carrier includes a cart that has a base and a plurality of wheels, such as a first pair of wheels and a second pair of wheels. Connected to a base of the cart is a jack that can be raised and lowered. In some embodiments, the jack is automated. Mounted to the jack is a coupler that is configured to receive and lock in place a ball of a hitch. The base can include one or more retention units to store sway bars. The weight distribution carrier can be collapsed or folded to allow for easy storage when not in use.

15 Claims, 4 Drawing Sheets

(56) References Cited

U.S. PATENT DOCUMENTS

| | | | | |
|---|---|---|---|---|
| 5,848,668 A * | 12/1998 | Kafrissen | B62B 3/12 | |
| | | | 187/231 | |
| 5,938,396 A * | 8/1999 | Audet | B25H 3/00 | |
| | | | 280/47.28 | |
| 5,984,341 A | 11/1999 | Kass et al. | | |
| 6,024,374 A * | 2/2000 | Friesen | B60D 1/06 | |
| | | | 280/47.27 | |
| 6,419,257 B1 | 7/2002 | McCoy et al. | | |
| 6,474,930 B1 * | 11/2002 | Simpson | A01B 73/00 | |
| | | | 269/17 | |
| 6,601,825 B2 * | 8/2003 | Bressner | B66F 9/06 | |
| | | | 254/2 R | |
| 6,726,237 B1 * | 4/2004 | Carrico | B60D 1/06 | |
| | | | 280/482 | |
| 7,025,370 B2 | 4/2006 | Anderson et al. | | |
| 7,398,990 B2 | 7/2008 | Tsai | | |
| 7,717,195 B2 * | 5/2010 | Paskar | E21B 7/005 | |
| | | | 173/185 | |
| 7,841,028 B1 * | 11/2010 | Rojas | A47K 17/00 | |
| | | | 280/47.24 | |
| 7,845,670 B2 * | 12/2010 | Oberg | B60D 1/66 | |
| | | | 280/47.24 | |
| 7,988,162 B2 * | 8/2011 | Sands | B25G 1/005 | |
| | | | 280/47.29 | |
| 8,672,200 B2 * | 3/2014 | O'Hare | B60R 9/06 | |
| | | | 224/519 | |
| 9,624,029 B2 * | 4/2017 | Nehring | B65D 85/70 | |
| 2008/0048161 A1 * | 2/2008 | Meyer | B66F 3/12 | |
| | | | 254/2 R | |
| 2009/0152832 A1 | 6/2009 | Moore et al. | | |
| 2010/0001241 A1 * | 1/2010 | Rentschler | B66F 9/06 | |
| | | | 254/2 R | |
| 2013/0037768 A1 * | 2/2013 | Hayes | B66C 23/48 | |
| | | | 254/327 | |
| 2013/0234414 A1 * | 9/2013 | Sims | B60D 1/465 | |
| | | | 280/490.1 | |
| 2017/0106778 A1 * | 4/2017 | McConn | B60P 3/073 | |

* cited by examiner

WEIGHT DISTRIBUTION CARRIER

CROSS REFERENCE TO RELATED APPLICATION

This application claims the benefit to U.S. Application No. 62/428,716 filed Dec. 1, 2016, incorporated by reference herein.

BACKGROUND OF THE INVENTION

This invention is directed towards a carrier. More specifically, and without limitation, this invention relates to a weight distribution carrier.

Weight distribution hitches are well known in the art. Weight distribution hitches are used to provide a level ride while towing a recreational vehicle (RV) or trailer, which may otherwise sag. By ensuring a level ride, the towing vehicle is able to maximize the towing capacity while maintaining the ability to steer and stop the vehicle.

Although weight distribution hitches provide many benefits over traditional hitches, which has resulted in their widespread adoption by consumers, problems remain. One primary problem relates to the installation and removal of weight distribution hitches.

Weight distribution hitches have considerable weight, which makes lifting them into the correct position during installation into a vehicle difficult. Similarly, the heft of a weight distribution hitch also makes removal a difficult task. As a result, the risk of back injury is ever present from simply lifting the weight distribution hitch into the correct position and pushing it into the receiver of the vehicle. If the weight distribution hitch is dropped, the impact could cause broken bones or lacerations, which is made even more dangerous for those individuals who are in remote locations, such as campsites.

Another issue related to weight distribution hitches is storage. Conventional weight distribution systems have a cumbersome design that does not lend itself to convenient storage. As a result, it is easy for the weight distribution hitch to fall over or be tripped on, which can result in significant injury.

Thus, it is a primary object of this invention to provide a weight distribution carrier that improves upon the art.

Another objective of this invention is to provide a weight distribution carrier that facilitates lifting a weight distribution hitch.

Yet another objective of this invention is to provide a weight distribution carrier that facilitates storage of a weight distribution hitch.

Another objective of this invention is to provide a weight distribution carrier that is user friendly.

Yet another objective of this invention is to provide a weight distribution carrier that is collapsible.

Another objective of this invention is to provide a weight distribution carrier that is convenient.

Yet another objective of this invention is to provide a weight distribution carrier that expedites installation and removal of a weight distribution hitch.

These and other objectives, features, and advantages of the invention will become apparent from the specification and claims.

BRIEF SUMMARY OF THE INVENTION

The present invention is a weight distribution carrier. The inventive device has a cart that has a base and wheels to allow movement of the cart. Mounted to the cart is a jack that raises and lowers a coupler that is mounted to the jack. The coupler is attached to a hitch, such as a weight distribution hitch, and then the cart is used to remove the hitch and hold it in place until used again. Similarly, the weight distribution cart can be used to install a hitch. In some embodiments of the invention, the coupler is attached by passing the jack through an opening in the coupler and mounting the coupler to a mount plate that is part of the jack.

In some instances of the cart, a handle is provided that allows the cart to be moved. When only two wheels are present, the handle can be manipulated by an individual to tilt the cart back to make movement easier. In other embodiments, wheels are positioned about the base so that the cart can be moved without tilting, and with and without the handle. Fixed wheels or caster wheels are used with the inventive device, which allows for direction to be changed more easily when caster wheels are present.

Retention units are present in some iterations of the present invention. The retention units are used to receive and store sway bars used with weight distribution hitches. In this way, all entirety of a weight distribution hitch can be stored on the weight distribution carrier.

To minimize the space occupied by the weight distribution carrier, the handle and wheels are collapsible or foldable, thereby condensing the profile of the weight distribution cart when not in use. In some arrangements, the jack is removable to allow the cart to be used for other tasks.

DETAILED DESCRIPTION

Figure 1:
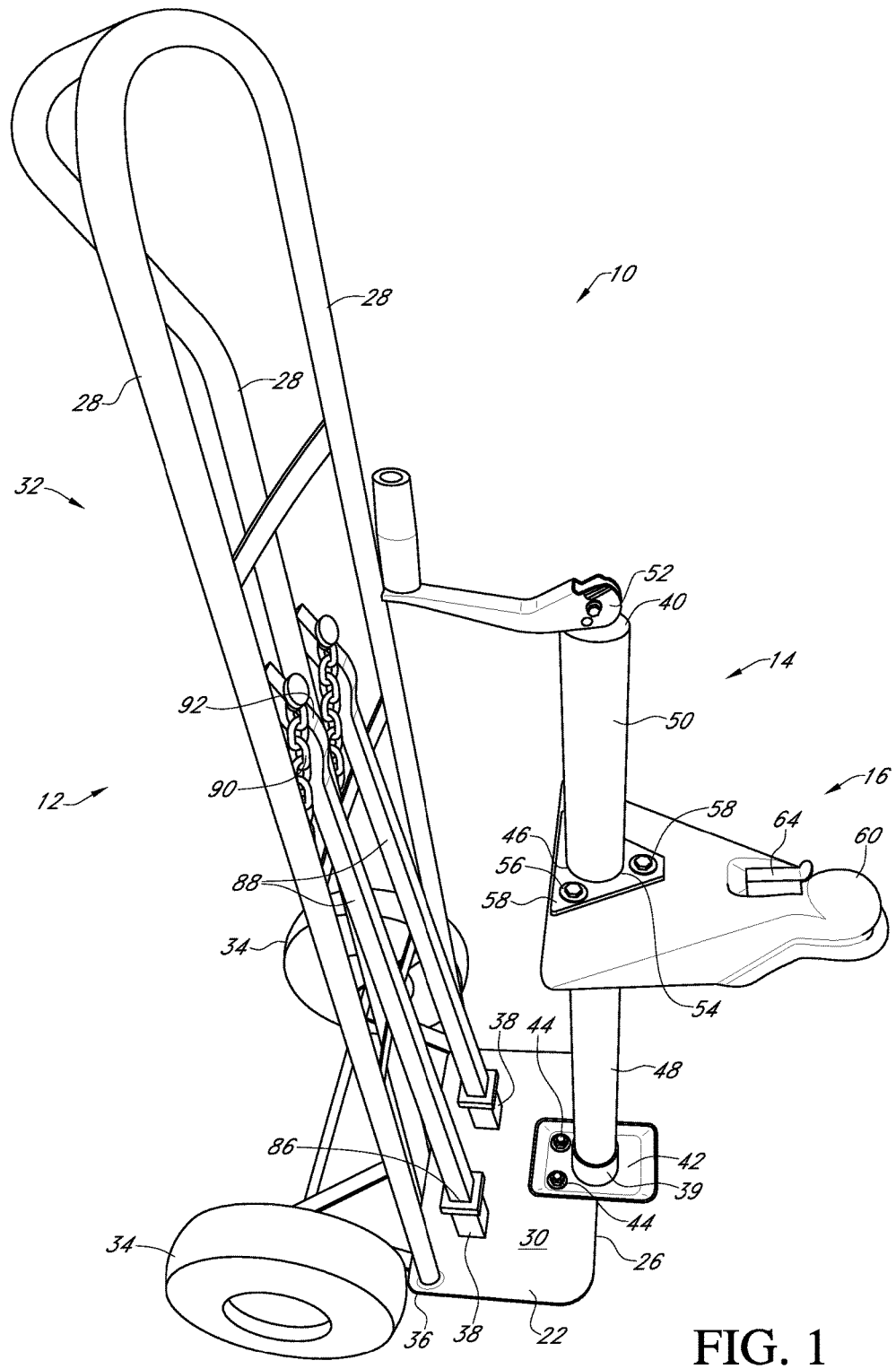
FIG. 1 is a perspective view of a weight distribution carrier.
Figure 2:
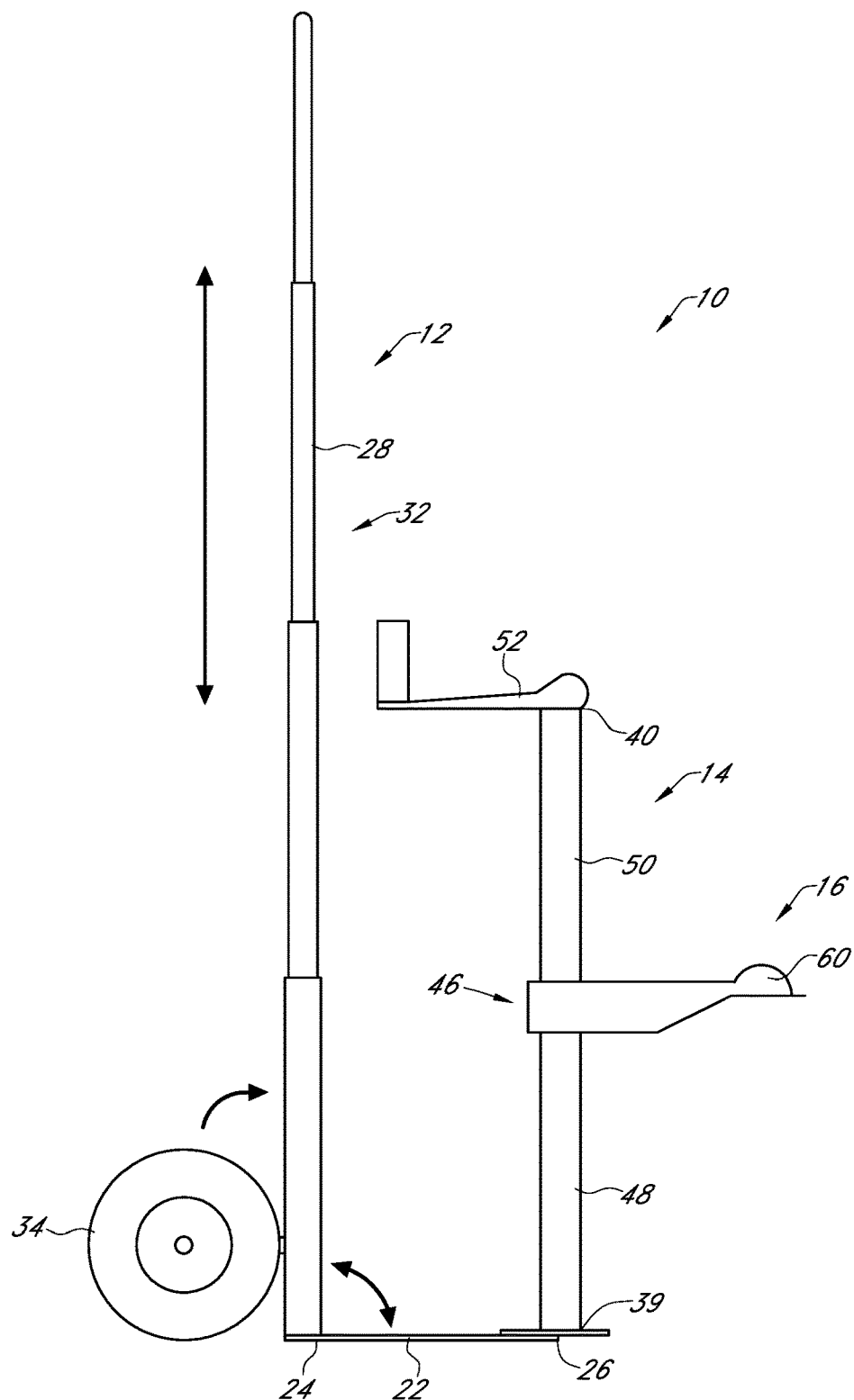
FIG. 2 is a side view of a weight distribution carrier.
Figure 3:
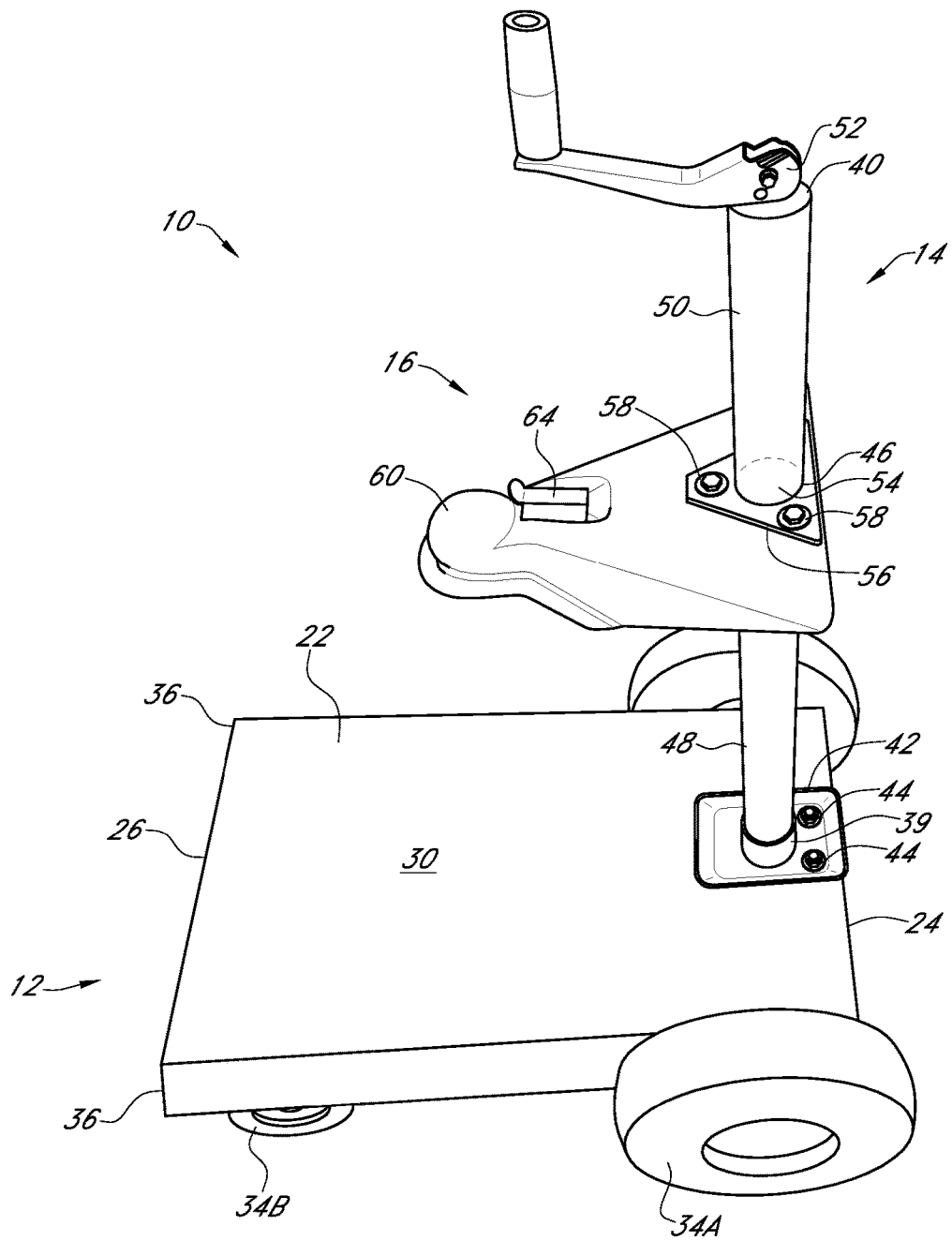
FIG. 3 is a perspective view of a weight distribution carrier.
Figure 4:
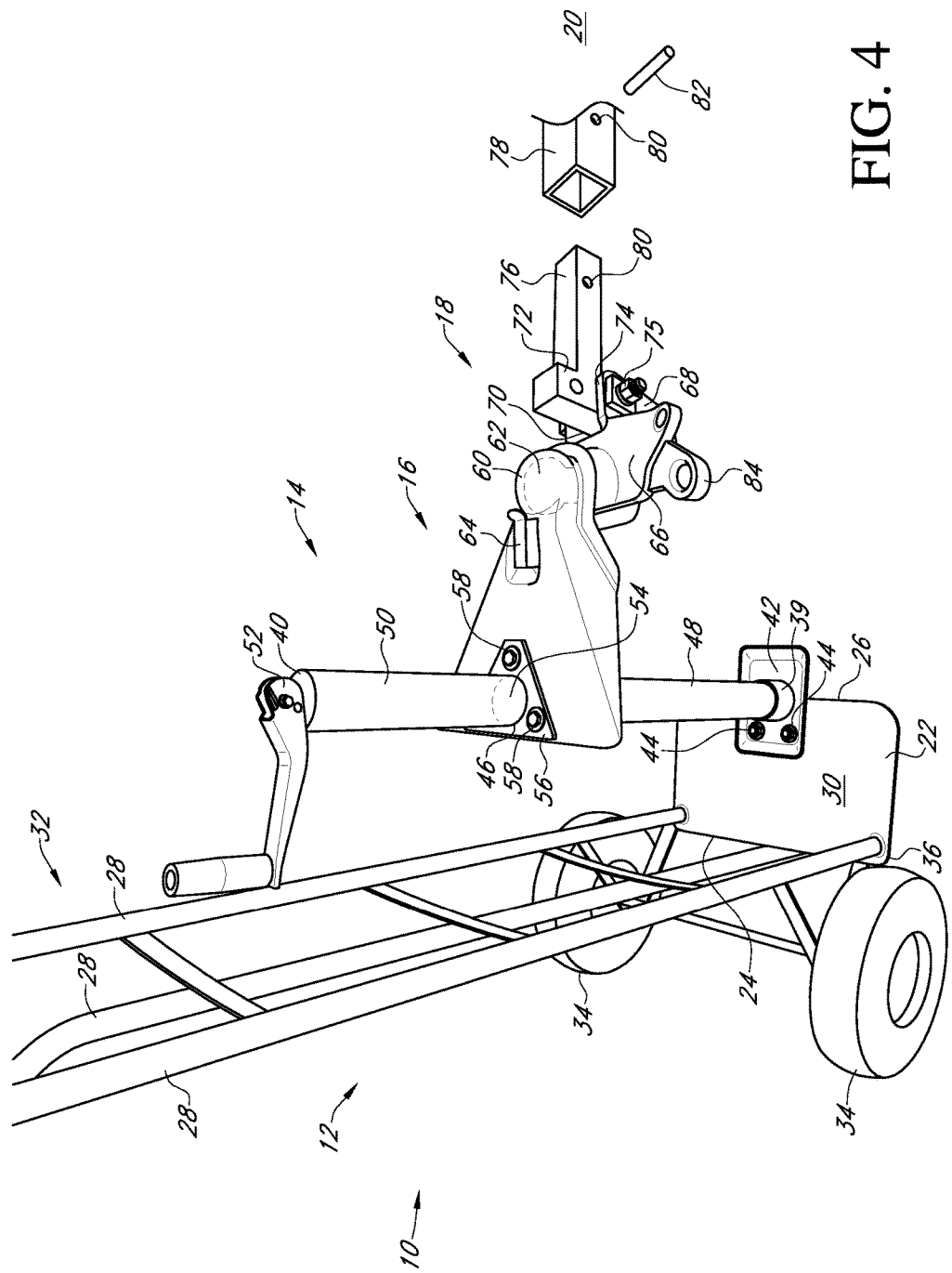
FIG. 4 is a perspective view of a weight distribution carrier.

With reference to the Figures, a weight distribution carrier 10 is shown having a cart 12, a jack 14, and a coupler 16, which attaches to a hitch 18, which in one embodiment is a weight distribution hitch 18 to install and remove the weight distribution hitch 18 from a vehicle 20. The cart 12 is sized and shaped to be manually manipulated by an individual.

The cart 12 has a base or base plate 22 that extends from a first end 24 to a second end 26, and in at least one arrangement, the base 22 is substantially rectangular in shape. In one variation of the present embodiment, the base 22 is made of metal, but can also be made of wood, plastic, or any other suitable material.

Connected to the first end 24 of the base 22 is a handle 32 having one or more support members 28 that extend upwardly from a top surface 30 of the base 22. In one arrangement, the support members 28 are foldably connected to the base 22 such that the base 22 can be folded up against the support members 28 in a compact fashion for use, but during use, the mass of the base 22 prevents the base 22 from folding back up without manual operation from an individual. In another embodiment, the support members 28 are telescopically connected to the base 22 or collapsible upon themselves. In one embodiment the support members 28 meet one another in an arch and in other embodiments at least one of the support member 28 extends outwardly in relation to the base 22. In other embodiments, the handle is detachable or otherwise not connected to the base plate 22.

Also connected to the base 22 are a plurality of wheels 34, which in some embodiments includes a first pair of wheels 34A and a second pair of wheels 34B. In one embodiment, the plurality of wheels 34 are only connected on or adjacent to a corner 36 on each side of the first end 24 of the base 22. In another embodiment, four wheels 34 are connected on, or adjacent to, all four corners 36 of the base 22. In some embodiments, the first pair of wheels 34A at the first end 24 are fixed, whereas the second pair of wheels 34B at the second end 26 are caster wheels 34B, in other arrangements, all four wheels 34 are caster wheels 34. In one such arrangement, the fixed wheels 34 are positioned outside the base 22 and the caster wheels 34 are positioned underneath the base 22. In still other arrangements, the wheels 34 at the first end 24 are larger than the wheels 34 at the second end 26. In one example of the present invention, one or more of the plurality of wheels 34 are foldably connected to the base 22 to provide for improved compact storage of the weight distribution carrier 10. In some arrangements, one or more wheel 34 is collapsible upwardly into the base 22 or collapsible to a position aligned with the handle 32, thereby minimizing the space occupied by the cart 12.

Positioned on the top surface 30 of the base 22 in some embodiments is one or more retention units 38. In one embodiment, the two retention units 38 are positioned adjacent the first end 24 and are square hollow compartments that extend upwardly from the top surface 30 of the base 22.

Mounted to the cart 12 is the jack 14. In one arrangement, the jack 14 is mounted adjacent to the second end 26. In one particular arrangement, the jack 14 is mounted in such a way that only a portion of the jack 14 is positioned on the top surface 30 of the base 12 and the rest of the jack 14 extends beyond the second end 26. In this arrangement, additional leverage is provided when the cart 12 is tilted back on the fulcrum of the first end 24, which is particularly useful when wheels 34 are only connected at the first end 24. In arrangements where wheels 34 are present at all four corners 36 of the base 22, the jack 14 may be mounted in a centralized location due to the lack of a need for a leverage point. The jack 14 in some embodiments is automated by motorization or other means, such as hydraulics, and is powered by an electrical cord 37 (not shown) that plugs into a conventional 7-way plug 41 (not shown) of a vehicle 20. In other embodiments, the jack 14 is powered by an alternative source of power, such as a rechargeable battery.

The jack 14 extends from a bottom end 39 to a top end 40. The jack 14 has a foot plate 42 at the bottom end 39 that receives one or more connection members 44 to mount the jack 14 to the base 22. The use of connection members 44 allows the removal of the jack 14 so that the cart 12 can be used for other tasks outside of a weight distribution carrier 10. Alternatively, the jack 14 can be permanently affixed to the base 22 by welding or other suitable means.

Extending upwardly from the foot plate 42 to a midpoint 46 is a drop leg 48 of the jack 14 that extends downwardly during operation of the jack 14 to raise and lower the jack 14. From the midpoint 46 to the top end 40 is a jack body 50 that extends upwardly during operation of the jack 14 to raise and lower the jack 14. Attached to the top end 40 is a crank 52 to operate the jack 14. In automated embodiments, the crank 52 is not always present.

The coupler 16 is mounted to the jack 14 on, or adjacent, the midpoint 46. The coupler 16 has an opening 54 that is sized and shaped to receive the jack 14 such that the coupler 16 engages a mount plate 56 on, or adjacent, the midpoint 46 of the jack 14. The coupler 16 is mounted to the jack 14 with one or more mounting members 58.

The coupler 16 has a ball receiver 60 that is sized and shaped to connect to a ball 62 of the weight distribution hitch 18. A latching device 64 positioned adjacent the ball receiver 60 is configured to engage the ball 62 to lock the ball 62 to the coupler 16.

In one embodiment of the weight distribution hitch 18, the ball 62 of the weight distribution hitch 18 is an attachment plate 66. The attachment plate 66 connects to a pair of vertical plates 68 that are in parallel-spaced alignment that form a gap 70 for receiving a hitch body 72. The pair of vertical plates 68 and the hitch body 72 have aligned apertures 74 that receive hitch connection members 75 that connect the hitch body to the vertical plates 68. Extending perpendicularly from the hitch body 72 in the opposite direction of the ball 62 is an elongated shank 76. The elongated shank 76 is received within a receiver 78 of the vehicle 20. The elongated shank 76 and the receiver 78 have an aligned opening 80 that receives a locking pin 82 that holds the shank 76 in place within the receiver 78.

Positioned below the attachment plate 66 and connected to the vertical plates 68 is a sway bars connector 84. The sway bars connector 84 receives a first end 86 of a pair of sway bars 88, which in some embodiments have a chain portion 90 that extends to a second end 92 of each sway bar 88.

In operation, to install the weight distribution hitch 18 into a vehicle 20, an individual rolls the cart 12 so that the ball receiver 60 of the coupler 16 is positioned over the ball 62 of the weight distribution hitch 18. The crank 52 of the jack 14 is then rotated until the coupler 16 mounted on the jack 14 engages the ball 62. In embodiments where the jack 14 is automated, the jack 14 is automated into position. Next, the latching device 64 is secured to the ball 62 to ensure that the coupler 16 does not come loose.

The first end 86 of each sway bar 88 is positioned inside the retention units 38, which are sized and shaped to receive the first end 86 of the sway bar 88, with the remaining portion of the sway bars 88 extending upwards. Alternatively, the sway bars 88 are laid on the base 22.

Depending on the embodiment of the cart 12, the weight distribution hitch 18 is transported near the vehicle 20. Individuals using embodiments of the present invention that use two wheels 34 positioned at the first end 24 only of the base 22 tilt the cart 12 back on the wheels 34 using the handle 32. In alternative embodiments, where wheels 34 are connected at both the first end 24 and the second end 26, such as two wheels 34 at the first end and one wheel 34 on the second end 26, the individual just pushes the cart 12 using the handle 32. Alternatively, the cart 12 could be pushed by pushing on the jack 12 if no handle 32 is present.

Once the cart 12 is in position, the jack 14 is raised or lowered to the correct height to align with the receiver 78 of the vehicle 20. The cart 12 is then wiggled or pushed forward until the elongated shank 76 is received in the receiver 78. In embodiments having more than two wheels 34, and especially when one or more caster wheels 34 is present, the ability to push the elongated shank 76 forward is facilitated compared to embodiments with only two wheels 34. The locking pin 82 is inserted through the aligned opening 82 to secure the elongated shank 76. Next, the sway bars 88 are removed from the cart 12 and connected to the sway bars connector 84 of the weight distribution hitch 18.

The latching device 64 is then disengaged to release the ball 62 from the coupler 16 and the jack 14 is raised using the crank 52. The cart 12 is moved away from the weight distribution hitch 18 without the individual ever having to lift the heft associated with the weight distribution hitch 18.

In some embodiments, after the weight distribution hitch 18 is installed in the vehicle 20, the cart 12 can be compacted and stored. To do so, the base 22 is folded upwards and towards the support members 28 such that the base 22 and the support members 28 lay in substantially parallel-space alignment while in a storage position. Additionally, in some arrangements, the plurality of wheels 34 are also foldable to conserve space, such that the base 22 and the plurality of wheels 34 lay in substantially parallel-space alignment while in a storage position. Also, in some arrangements, the support members 28 are telescopically formed, allowing for the length of the support member 28 to be reduced by retraction into support member 28 itself.

To remove the weight distribution hitch 18, the weight distribution carrier 10 is positioned such that the ball receiver 60 of the coupler 16 is again positioned over the ball 62 of the weight distribution hitch 18 by rolling the cart 12 into position. The jack 14 is lowered until the coupler 16 engages the ball 62 and the latching device 64 is engaged. Then the locking pin 82 is removed from the elongated shank 76 and the receiver 78. Next, the sway bars 88 are removed and either placed on the base 22 or in the retention units 38. The cart 12 is then pulled away from the vehicle 20 with the weight distribution hitch 18 connected to the coupler 16. The weight distribution carrier 10 can then be stored with the weight distribution hitch 18 if desired, until needed in the future.

Therefore, a weight distribution carrier 10 has been provided that facilitates lifting a weight distribution hitch, facilitates storage of a weight distribution hitch, is user friendly, is collapsible, is convenient, that expedites installation and removal of a weight distribution hitch, and improves upon the art.

From the above discussion, and accompanying figures and claims, it will be appreciated that the weight distribution carrier 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A weight distribution carrier, comprising:
   a cart having a base and a first pair of wheels;
   a jack having a jack leg and a jack body mounted to the base, wherein the jack leg is received within the jack body;
   a mount plate positioned at and connected adjacent to a lower distal end of the jack body;
   a coupler having an opening sized and shaped to receive the jack body, wherein the coupler is configured to receive a weight distribution hitch;
   the jack body received through the opening in the coupler and mounted to the coupler by connection and engagement with the mount plate.

2. The weight distribution carrier of claim 1 further comprising a handle attached to a first end of the base.

3. The weight distribution carrier of claim 2 wherein the handle is foldably attached to the base.

4. The weight distribution carrier of claim 2 wherein the handle is telescopic.

5. The weight distribution carrier of claim 2 wherein the handle is detachably attached to the base.

6. The weight distribution carrier of claim 1 wherein the first pair of wheels are connected at a first end of the base.

7. The weight distribution carrier of claim 1 wherein the first pair of wheels are fixedly connected to the base.

8. The weight distribution carrier of claim 1 wherein the first pair of wheels are foldably connected to the base.

9. The weight distribution carrier of claim 6 further comprising a second pair of wheels connected at a second end of the base.

10. The weight distribution cart of claim 9 wherein the second pair of wheels are caster wheels.

11. The weight distribution carrier of claim 1 further comprising at least one retention unit positioned on the base of the cart, wherein the retention unit is configured to receive an end of a sway bar, such that the rest of the sway bar extends vertically upwards.

12. The weight distribution carrier of claim 1 wherein the jack is automated.

13. The weight distribution carrier of claim 1 further comprising the jack having a foot plate at a bottom end.

14. The weight distribution carrier of claim 1 wherein the coupler is configured to lock the weight distribution hitch in place.

15. The weight distribution carrier of claim 1 wherein the jack is detachably mounted to the base.

* * * * *